United States Patent
Wilfert

[15] 3,666,316
[45] May 30, 1972

[54] INSTALLATION FOR REDUCING THE SOILING OF SIDE WINDOWS OF A MOTOR VEHICLE

[72] Inventor: Karl Wilfert, Gerlingen-Waldstadt, Germany

[73] Assignee: Daimler-Benz Aktiengesellschaft, Stuttgart-Unterturkheim, Germany

[22] Filed: Oct. 8, 1969

[21] Appl. No.: 864,606

[30] Foreign Application Priority Data

Oct. 12, 1968 Germany.....................P 18 02 853.0

[52] U.S. Cl. .............................296/84 C, 296/91, 296/93, 296/137 R
[51] Int. Cl. ..........................................................B60j 1/20
[58] Field of Search....................296/84 R, 84 C, 91, 93, 137

[56] References Cited

UNITED STATES PATENTS

| 2,930,652 | 3/1960 | Bidlingmaier | 296/137 |
| 3,155,420 | 11/1964 | Belsky | 296/84 X |
| 3,326,599 | 6/1967 | Pashenee | 296/137 |

FOREIGN PATENTS OR APPLICATIONS

| 1,462,747 | 11/1966 | France | 296/91 |
| 1,235,164 | 2/1967 | Germany | 296/93 |

Primary Examiner—Benjamin Hersh
Assistant Examiner—Leslie J. Paperner
Attorney—Craig, Antonelli and Hill

[57] ABSTRACT

An installation for precluding the soiling of the side windows of a motor vehicle, especially of a passenger motor vehicle, in which a profiled molding is provided within the area of the column of the windshield which possesses a deflecting edge pointing in the driving direction.

19 Claims, 4 Drawing Figures

PATENTED MAY 30 1972    3,666,316

INVENTOR
KARL WILFERT

BY
Craig, Antonelli, Stewart & Hill
ATTORNEYS

INSTALLATION FOR REDUCING THE SOILING OF SIDE WINDOWS OF A MOTOR VEHICLE

The present invention relates to an installation for the reduction of the soiling of the side windows of a motor vehicle, especially of a passenger motor vehicle.

Even though during the drive the side windows are not acted upon frontally by rain water or spray water or by thrown-up dirt, water, nevertheless, collects at the side windows and dirt is deposited at these windows which cannot be carried away by reason of the prevailing pressure conditions so that they cause a considerable impairment of the visibility of the driver and therewith of the safety.

The present invention aims at avoiding these disadvantages and therewith to increase the safety of motor vehicles.

The present invention essentially consists that a profile strip or sectional molding is mounted within the area of the columns of the windshield pane, which includes a deflecting edge pointing in the driving direction. The deflecting edge of the profile strip or molding which additionally influences the pressure conditions within the area of the side windows, prevents that the water or dirt-water flowing off from the windshield pane can reach the area of the side windows, especially of the front side windows which are decisive for the visibility of the driver.

In a structurally advantageous manner the profile strip or sectional molding may be made of rubber or of conventional synthetic resinous material. It may be secured at the enclosure rubber of the windshield pane and/or at the column by adhesively bonding, clamping or clips. An advantageous type of construction of the present invention is obtained if the profile strip or molding is made in one piece with the border or enclosure rubber of the windshield pane.

In order to obtain an optically pleasing impression and to render more difficult the detachment of the profile strip or molding, the profile strip or molding can be extended beyond the column of the windshield and may be secured at the edge of the roof. The profile strip or molding may thereby enclose the upper edge of the door aperture. An improved rain channel is created thereby which prevents the dripping down of water also at low driving velocities. In another type of construction, it may be appropriate if the profile strip or molding extends to the rear windowpane.

Accordingly, it is an object of the present invention to provide an installation for reducing the soiling of the side windows of a motor vehicle which is simple in construction and effective in operation.

Another object of the present invention resides in an installation for reducing the soiling of side windows in motor vehicles to increase the driver's visibility and therewith the safety of the vehicle.

A further object of the present invention resides in an installation for preventing the soiling of side windows in passenger motor vehicles which precludes dripping down of water over the windows even at low vehicle speeds.

These and further objects, features and advantages of the present invention will become more obvious from the following description when taken in connection with the accompanying drawing which shows, for purposes of illustration only, one embodiment in accordance with the present invention, wherein.

Figure 1:
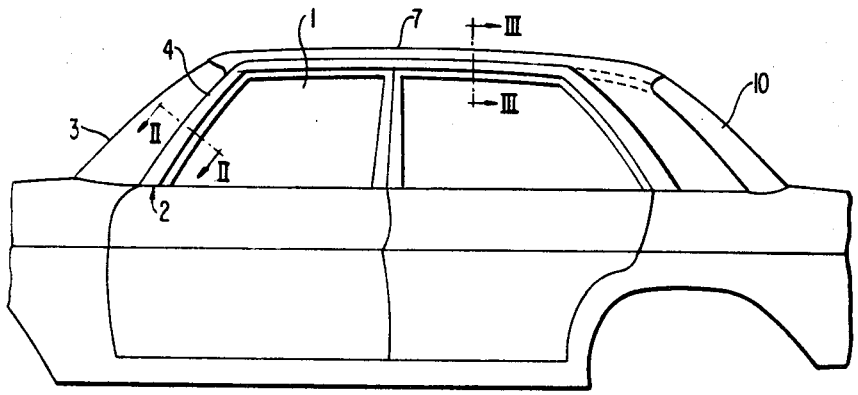
FIG. 1 is a partial side view of a passenger motor vehicle body equipped with an installation for preventing the soiling of the side windows in accordance with the present invention.
Figure 2:
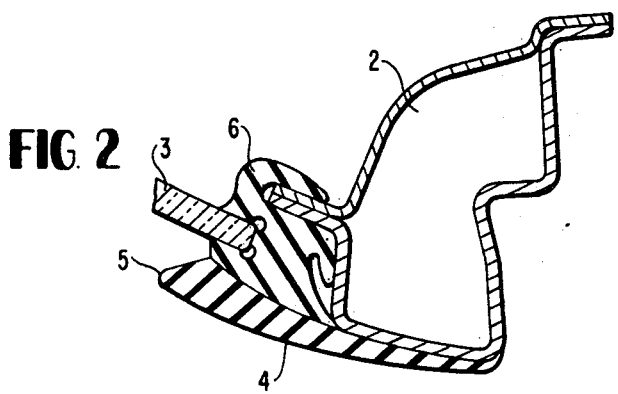
FIG. 2 is a cross-sectional view, on an enlarged scale, taken along line II—II of FIG. 1.

Referring now to the drawing wherein like reference numerals are used throughout the various views to designate like parts, and more particularly to FIG. 1, in order to reduce the soiling especially of the front side windows 1, which is of considerable significance for the visibility and therewith for the safety, a profile strip or molding 4 is mounted within the area of the column 2 of the windshield 3, the profile strip or molding 4 includes a deflection edge 5 extending in the driving direction and disposed at a distance from the windshield 3. The deflecting edge 5 extends approximately parallel to the side edge of the windshield pane 3. This profile strip or molding 3 provided with such deflection edge 5 precludes that the water pushed toward the side by the windshield wipers (not shown) of the windshield 3 or flowing off as a result of the vehicle velocity, is able to reach the area of the side windowpane 1.

The profile strip or molding 4 is made in an advantageous manner of rubber or of conventional synthetic resinous material of any known suitable type. In the illustrated embodiment the profile strip or molding 4 is adhesively secured at the enclosure rubber 6 of the windshield 3 and at the column 2. However, the securing can take place also in any other suitable manner, for example, by clamping or by the use of appropriate clips. An advantageous type of construction is also obtained if the profile strip or molding 4 is made in one piece with the enclosure rubber 6 of the windshield 3.

Figure 3:
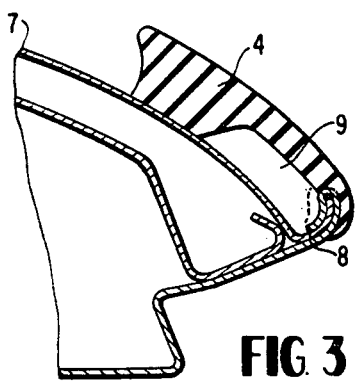
FIG. 3 is a cross-sectional view, also on an enlarged scale, taken along line III—III of FIG. 1.
Figure 4:
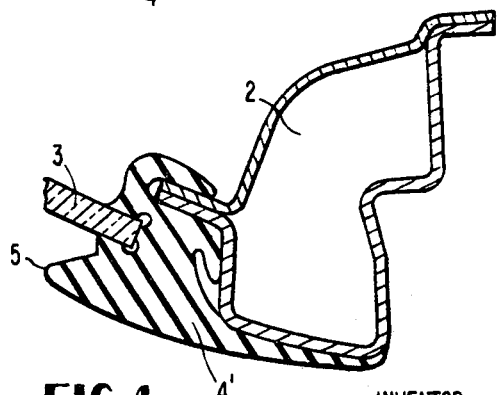
FIG. 4 shows this arrangement with unitary profile strip 4'.

The profile strip or molding 4 is extended in the illustrated embodiment beyond the windshield 3 and is secured at the edge of the roof 7 of the body. As illustrated in FIG. 3, a hollow space 9 may thereby remain within the area of the roof channel 8. In the embodiment according to FIG. 1 the door opening of the four-door body is completely enclosed in the upper area by the profile strip or molding 4 made of rubber or synthetic resinous material. However, with certain types of vehicle bodies it may also be favorable if the profile strip or molding 4 is arranged as shown in the construction indicated in dash lines and extends along the roof edge up to the area of the rear windowpane.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are within the scope of those skilled in the art.

I claim:

1. An installation for reducing the soiling of the side windows of a motor vehicle having column means and enclosure means for the windshield; said installation comprising: profile molding means extending along the edge of the column means of the windshield, said molding means including a deflection edge means pointing generally forwardly in the driving direction, said deflection means forming one side wall of a forwardly open channel, the opposite side wall of said channel including portions of the windshield adjacent the enclosure means, whereby water impinging on the windshield is prevented from soiling side windows during normal driving conditions.

2. An installation according to claim 1, characterized in that the molding means is made from rubber.

3. An installation according to claim 1, characterized in that the molding means is made from synthetic resinous material.

4. An installation according to claim 1, characterized in that the molding means is made entirely in one piece with the enclosure means of the windshield.

5. An installation according to claim 1, characterized in that the opposite side wall of said channel further includes portions of the molding means.

6. An installation according to claim 1, characterized in that the molding means is secured at least at one of the two parts consisting of the enclosure means for the windshield and of the column means.

7. An installation according to claim 6, characterized in that the molding means is secured at said two parts consisting of the enclosure means of the windshield and of the column means.

8. An installation according to claim 6, characterized in that the molding means is secured at the corresponding parts by adhesive bonding.

9. An installation according to claim 6, characterized in that the molding means is secured at the respective part by clamping means.

10. An installation according to claim 6, characterized in that the molding means is secured at the respective part by clip means.

11. An installation for a vehicle with roof means according to claim 1, characterized in that the molding means is extended beyond the column means of the windshield and is secured at the edge of the roof means.

12. An installation according to claim 11, characterized in that the molding means extends substantially to the rear window.

13. An installation according to claim 11, characterized in that that portion of the deflection edge means extending along the roof means forms one side wall of an upwardly open channel, the opposite side wall of said upwardly open channel being formed by portions of the roof means.

14. An installation according to claim 13, characterized in that the molding means extends substantially to the rear window.

15. An installation according to claim 11, characterized in that the molding means encloses the upper edges of a door aperture.

16. An installation according to claim 15, characterized in that the molding means extends substantially to the rear window.

17. An installation according to claim 16, characterized in that the molding means is secured at least at one of the two parts consisting of the enclosure means for the windshield and of the column means.

18. An installation according to claim 16, characterized in that the molding means is secured at said two parts consisting of the enclosure means of the windshield and of the column means.

19. An installation according to claim 16, characterized in that the molding means is made entirely in one piece with the enclosure means of the windshield.

* * * * *